US008879567B1

(12) United States Patent
Evans

(10) Patent No.: US 8,879,567 B1
(45) Date of Patent: Nov. 4, 2014

(54) HIGH-SPEED WAN TO WIRELESS LAN GATEWAY

(75) Inventor: Gregory Morgan Evans, Raleigh, NC (US)

(73) Assignee: Qurio Holdings, Inc., Raleigh, NC (US)

(*) Notice: Subject to any disclaimer, the term of this patent is extended or adjusted under 35 U.S.C. 154(b) by 63 days.

(21) Appl. No.: 13/329,992

(22) Filed: Dec. 19, 2011

Related U.S. Application Data

(63) Continuation of application No. 11/475,360, filed on Jun. 27, 2006, now Pat. No. 8,102,863.

(51) Int. Cl.
*H04L 12/28* (2006.01)
*H04J 3/22* (2006.01)

(52) U.S. Cl.
USPC .......................................... 370/401; 370/466

(58) Field of Classification Search
USPC ........................................................ 370/401
See application file for complete search history.

(56) References Cited

U.S. PATENT DOCUMENTS

| 5,278,834 | A | * | 1/1994 | Mazzola | ........................ | 370/469 |
| 5,613,004 | A | | 3/1997 | Cooperman et al. | | |
| 5,687,236 | A | | 11/1997 | Moskowitz et al. | | |
| 5,758,257 | A | | 5/1998 | Herz et al. | | |
| 5,790,935 | A | | 8/1998 | Payton et al. | | |
| 5,818,838 | A | * | 10/1998 | Backes et al. | .................. | 370/390 |
| 5,905,800 | A | | 5/1999 | Moskowitz et al. | | |
| 6,076,108 | A | | 6/2000 | Courts et al. | | |
| 6,128,736 | A | | 10/2000 | Miller | | |
| 6,141,753 | A | | 10/2000 | Zhao et al. | | |
| 6,282,299 | B1 | | 8/2001 | Tewfik et al. | | |
| 6,370,584 | B1 | | 4/2002 | Bestavros et al. | | |
| 6,385,641 | B1 | | 5/2002 | Jiang et al. | | |
| 6,389,541 | B1 | | 5/2002 | Patterson | | |
| 6,411,946 | B1 | | 6/2002 | Chaudhuri | | |

(Continued)

FOREIGN PATENT DOCUMENTS

| GB | 2306869 A | 5/1997 |
| WO | 0040021 A1 | 7/2000 |
| WO | 0069163 A2 | 11/2000 |
| WO | 2006046099 A2 | 5/2006 |

OTHER PUBLICATIONS

Author Unknown, "Cisco AON: A Network-Based Intelligent Message Routing System," Cisco Systems, Inc., 2006, http://www.cisco.com/en/US/products/ps6438/products_data_sheet0900aecd802c1f9c.html, accessed on Jan. 9, 2007, 7 pages.

(Continued)

*Primary Examiner* — Warner Wong
(74) *Attorney, Agent, or Firm* — Withrow & Terranova, PLLC

(57) ABSTRACT

A gateway interconnecting a high speed Wide Area Network (WAN) and a lower speed Wireless Local Area Network (WLAN) is provided. The high speed WAN is preferably connected to the gateway via a Fiber-to-the Home (FTTH) connection and associated FTTH modem. In general, the gateway includes an adaptable cross-layer offload engine operating to manage bandwidth between the high speed WAN and the lower speed WLAN. As data enters the gateway from the WAN at the high speed data rate of the WAN, the offload engine stores the data in a non-secure data cache. A rule check engine performs a stateless or stateful inspection of the data in the non-secure data cache. Thereafter, the data is moved from the non-secure data cache to a secure data cache and thereafter transmitted to an appropriate user device in the WLAN at the lower data rate of the WLAN.

34 Claims, 4 Drawing Sheets

(56) References Cited

U.S. PATENT DOCUMENTS

| | | |
|---|---|---|
| 6,470,332 B1 | 10/2002 | Weschler |
| 6,470,389 B1 | 10/2002 | Chung et al. |
| 6,510,234 B1 | 1/2003 | Cox et al. |
| 6,665,536 B1 | 12/2003 | Mahany |
| 6,721,282 B2 | 4/2004 | Motley |
| 6,735,699 B1 | 5/2004 | Sasaki et al. |
| 6,751,670 B1 | 6/2004 | Patterson |
| 6,774,926 B1 | 8/2004 | Ellis et al. |
| 6,789,116 B1 | 9/2004 | Sarkissian et al. |
| 6,791,962 B2 | 9/2004 | Wentink |
| 6,804,779 B1 | 10/2004 | Carroni et al. |
| 6,839,751 B1 | 1/2005 | Dietz et al. |
| 6,865,605 B1 | 3/2005 | Soderberg et al. |
| 6,871,236 B2 | 3/2005 | Fishman et al. |
| 6,891,766 B2 | 5/2005 | Choi et al. |
| 6,891,796 B1 | 5/2005 | Manis et al. |
| 6,970,848 B2 | 11/2005 | Osaka et al. |
| 6,975,743 B2 | 12/2005 | Venkatesan et al. |
| 6,987,985 B2 | 1/2006 | Purkayastha et al. |
| 7,002,955 B1 | 2/2006 | Kanuri et al. |
| 7,003,131 B2 | 2/2006 | Watson et al. |
| 7,016,668 B2 | 3/2006 | Vaidyanathan et al. |
| 7,020,304 B2 | 3/2006 | Alattar et al. |
| 7,036,024 B2 | 4/2006 | Watson |
| 7,039,562 B1 | 5/2006 | Notani et al. |
| 7,065,607 B2 | 6/2006 | England et al. |
| 7,130,872 B2 | 10/2006 | de Bonet |
| 7,149,807 B1 | 12/2006 | Kontothanassis |
| 7,203,744 B1 | 4/2007 | Parekh et al. |
| 7,263,545 B2 | 8/2007 | Digate et al. |
| 7,356,013 B2 | 4/2008 | Linder et al. |
| 7,376,790 B2 | 5/2008 | Lango et al. |
| 7,382,879 B1* | 6/2008 | Miller ............................ 380/201 |
| 7,430,302 B2 | 9/2008 | Thorwirth |
| 7,512,973 B1 | 3/2009 | Chan et al. |
| 7,522,571 B2 | 4/2009 | Ginzburg |
| 7,607,170 B2 | 10/2009 | Chesla |
| 7,624,436 B2 | 11/2009 | Balakrishnan et al. |
| 7,656,849 B1 | 2/2010 | Evans |
| 7,733,772 B2 | 6/2010 | Hazra et al. |
| 7,733,908 B1 | 6/2010 | Evans |
| 7,739,658 B2 | 6/2010 | Watson et al. |
| 7,769,851 B1 | 8/2010 | Guruswamy et al. |
| 7,801,945 B1 | 9/2010 | Geddes et al. |
| 7,895,442 B1* | 2/2011 | Adams et al. ................ 713/176 |
| 7,983,440 B1 | 7/2011 | Roberts et al. |
| 7,987,490 B2* | 7/2011 | Ansari et al. ..................... 725/82 |
| 8,054,815 B2 | 11/2011 | Evans |
| 2001/0051996 A1 | 12/2001 | Cooper et al. |
| 2002/0010759 A1 | 1/2002 | Hitson et al. |
| 2002/0013812 A1 | 1/2002 | Krueger et al. |
| 2002/0049580 A1 | 4/2002 | Kutaragi et al. |
| 2002/0054578 A1 | 5/2002 | Zhang et al. |
| 2002/0061029 A1 | 5/2002 | Dillon |
| 2002/0104003 A1 | 8/2002 | Iwamura |
| 2002/0104015 A1 | 8/2002 | Barzilai et al. |
| 2002/0104099 A1 | 8/2002 | Novak |
| 2002/0107934 A1 | 8/2002 | Lowery et al. |
| 2002/0110123 A1* | 8/2002 | Shitama ........................ 370/389 |
| 2002/0114336 A1* | 8/2002 | Chow ............................ 370/401 |
| 2002/0129367 A1 | 9/2002 | Devara |
| 2002/0144267 A1 | 10/2002 | Gutta et al. |
| 2002/0156842 A1 | 10/2002 | Signes et al. |
| 2002/0168082 A1 | 11/2002 | Razdan |
| 2002/0199203 A1* | 12/2002 | Duffy et al. ................... 725/109 |
| 2003/0009769 A1 | 1/2003 | Hensgen et al. |
| 2003/0012403 A1 | 1/2003 | Rhoads et al. |
| 2003/0046270 A1 | 3/2003 | Leung et al. |
| 2003/0050055 A1 | 3/2003 | Ting et al. |
| 2003/0058836 A1* | 3/2003 | Even ............................. 370/352 |
| 2003/0081580 A1 | 5/2003 | Vaidyanathan et al. |
| 2003/0093665 A1 | 5/2003 | Cooper et al. |
| 2003/0110234 A1 | 6/2003 | Egli et al. |
| 2003/0145325 A1 | 7/2003 | Finster et al. |
| 2003/0152096 A1 | 8/2003 | Chapman |
| 2003/0161268 A1 | 8/2003 | Larsson et al. |
| 2003/0217099 A1 | 11/2003 | Bobde et al. |
| 2004/0006615 A1 | 1/2004 | Jackson |
| 2004/0008864 A1 | 1/2004 | Watson et al. |
| 2004/0009751 A1 | 1/2004 | Michaelis et al. |
| 2004/0010692 A1 | 1/2004 | Watson |
| 2004/0010694 A1 | 1/2004 | Collens et al. |
| 2004/0030798 A1 | 2/2004 | Andersson et al. |
| 2004/0042421 A1 | 3/2004 | Mahany |
| 2004/0049787 A1 | 3/2004 | Maissel et al. |
| 2004/0070593 A1 | 4/2004 | Neely et al. |
| 2004/0083487 A1 | 4/2004 | Collens et al. |
| 2004/0086122 A1 | 5/2004 | Watson |
| 2004/0088369 A1 | 5/2004 | Yeager et al. |
| 2004/0088557 A1 | 5/2004 | Malcolm et al. |
| 2004/0117824 A1 | 6/2004 | Karaoguz et al. |
| 2004/0139047 A1 | 7/2004 | Rechsteiner et al. |
| 2004/0156528 A1 | 8/2004 | Joo et al. |
| 2004/0187005 A1 | 9/2004 | Molaro |
| 2004/0199630 A1 | 10/2004 | Sarkissian et al. |
| 2004/0240405 A1 | 12/2004 | Okazaki |
| 2004/0248615 A1 | 12/2004 | Purkayastha et al. |
| 2004/0252651 A1* | 12/2004 | Karlsen et al. ................ 370/264 |
| 2004/0254998 A1 | 12/2004 | Horvitz |
| 2004/0263941 A1 | 12/2004 | Chen et al. |
| 2004/0264372 A1 | 12/2004 | Huang |
| 2004/0267900 A1 | 12/2004 | Hoekstra et al. |
| 2005/0008017 A1 | 1/2005 | Datta et al. |
| 2005/0010664 A1 | 1/2005 | Hubbard |
| 2005/0030976 A1 | 2/2005 | Wentink |
| 2005/0034001 A1 | 2/2005 | Pontarelli |
| 2005/0036469 A1 | 2/2005 | Wentink |
| 2005/0044422 A1 | 2/2005 | Cantrell et al. |
| 2005/0050103 A1 | 3/2005 | Kesteloot et al. |
| 2005/0065891 A1 | 3/2005 | Lee et al. |
| 2005/0081042 A1 | 4/2005 | Venkatesan et al. |
| 2005/0086069 A1 | 4/2005 | Watson et al. |
| 2005/0097331 A1 | 5/2005 | Majidimehr et al. |
| 2005/0108769 A1 | 5/2005 | Arnold et al. |
| 2005/0120091 A1 | 6/2005 | Casais et al. |
| 2005/0120127 A1 | 6/2005 | Bradley et al. |
| 2005/0125405 A1 | 6/2005 | Watson et al. |
| 2005/0135305 A1 | 6/2005 | Wentink |
| 2005/0143123 A1 | 6/2005 | Black et al. |
| 2005/0165828 A1 | 7/2005 | Lango et al. |
| 2005/0169632 A1 | 8/2005 | Song et al. |
| 2005/0182989 A1 | 8/2005 | Zarnke et al. |
| 2005/0183120 A1 | 8/2005 | Jain et al. |
| 2005/0192987 A1 | 9/2005 | Marsh |
| 2005/0201340 A1 | 9/2005 | Wang et al. |
| 2005/0201726 A1 | 9/2005 | Malcolm et al. |
| 2005/0216942 A1 | 9/2005 | Barton |
| 2005/0220321 A1 | 10/2005 | Langelaar |
| 2005/0229246 A1 | 10/2005 | Rajagopal et al. |
| 2005/0238012 A1 | 10/2005 | Panigrahy et al. |
| 2005/0239497 A1 | 10/2005 | Bahl et al. |
| 2005/0251491 A1 | 11/2005 | Medina et al. |
| 2005/0281194 A1 | 12/2005 | Sonoda |
| 2005/0286438 A1 | 12/2005 | Rajkotia |
| 2006/0002377 A1 | 1/2006 | Skog et al. |
| 2006/0010274 A1 | 1/2006 | Olson |
| 2006/0015735 A1 | 1/2006 | Kudo et al. |
| 2006/0037077 A1 | 2/2006 | Gadde et al. |
| 2006/0048185 A1 | 3/2006 | Alterman |
| 2006/0048186 A1 | 3/2006 | Alterman |
| 2006/0050880 A1 | 3/2006 | Taylor et al. |
| 2006/0053452 A1 | 3/2006 | Lee et al. |
| 2006/0056349 A1 | 3/2006 | Nakatugawa et al. |
| 2006/0059560 A1 | 3/2006 | Montulli |
| 2006/0072786 A1 | 4/2006 | Watson et al. |
| 2006/0075243 A1 | 4/2006 | Lakamp et al. |
| 2006/0080707 A1 | 4/2006 | Laksono |
| 2006/0085830 A1 | 4/2006 | Bruck et al. |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095792 A1 | 5/2006 | Hurtado et al. |
| 2006/0114832 A1 | 6/2006 | Hamilton et al. |
| 2006/0123235 A1 | 6/2006 | Vanstone |

(56) References Cited

U.S. PATENT DOCUMENTS

| | | | |
|---|---|---|---|
| 2006/0127037 A1 | 6/2006 | Van Hoff et al. |
| 2006/0129672 A1 | 6/2006 | Mayer |
| 2006/0129810 A1 | 6/2006 | Jeong et al. |
| 2006/0133644 A1 | 6/2006 | Wells et al. |
| 2006/0156003 A1 | 7/2006 | Zhang et al. |
| 2006/0161776 A1 | 7/2006 | Van Der Veen et al. |
| 2006/0173794 A1 | 8/2006 | Sellars et al. |
| 2006/0174128 A1 | 8/2006 | Yuval |
| 2006/0182101 A1 | 8/2006 | Hoekstra et al. |
| 2006/0200416 A1 | 9/2006 | White et al. |
| 2006/0206933 A1 | 9/2006 | Molen et al. |
| 2006/0215596 A1 | 9/2006 | Krishnaswamy et al. |
| 2006/0233101 A1 | 10/2006 | Luft et al. |
| 2006/0270415 A1 | 11/2006 | Waxman |
| 2006/0277271 A1 | 12/2006 | Morse et al. |
| 2007/0002742 A1 | 1/2007 | Krishnaswamy et al. |
| 2007/0008978 A1 | 1/2007 | Pirzada et al. |
| 2007/0058561 A1 | 3/2007 | Virgile |
| 2007/0061488 A1 | 3/2007 | Alagappan et al. |
| 2007/0061580 A1 | 3/2007 | Venkatesan et al. |
| 2007/0064643 A1 | 3/2007 | Tavares |
| 2007/0110080 A1 | 5/2007 | Bennett |
| 2007/0133673 A1 | 6/2007 | Imaizumi |
| 2007/0214237 A1 | 9/2007 | Stibel et al. |
| 2007/0223437 A1 | 9/2007 | Virgile |
| 2007/0282847 A1 | 12/2007 | Gwozdz |
| 2008/0044087 A1 | 2/2008 | Levy et al. |
| 2009/0037388 A1 | 2/2009 | Cooper et al. |
| 2009/0067328 A1* | 3/2009 | Morris et al. | ............ 370/230.1 |
| 2009/0137009 A1* | 5/2009 | Lai et al. | ...................... 435/101 |
| 2009/0287837 A1 | 11/2009 | Felsher |
| 2010/0174770 A1 | 7/2010 | Pandya |
| 2011/0087750 A1 | 4/2011 | Gwozdz |

OTHER PUBLICATIONS

Author Unknown, "Double 108Mbps Wireless PC Card (WG511U), Netgear, Inc.," PC Connection, 2006, http://http://www.pcconnection.com/ProductDetail?sku=5373172&SourceID=k40132, accessed on Apr. 5, 2006, 2 pages.

Author Unknown, "Gefen—HDMI CAT-5 Extreme," User Manual, Gefen Inc., 2006, 16 pages.

Author Unknown, "Global-Link Product Manual," Logical Solutions Inc., Copyright 2003, Revision C, Jan. 2005, 68 pages.

Author Unknown, "Global-Link: KVM over IP," Thinklogical LLC, http://www.thinklogical.com/products/globalLink.php, accessed Jul. 13, 2007, 1 page.

Author Unknown, "HDTV Extender: Extend a HDTV display and speakers up to 600 feet from a YPbPr component video source," NTI, 2005, 2 pages.

Author Unknown, "Introducing the World's First 'Legal' HDMI Distribution Amp with HDCP on Every Port!", PureLink Digital Extender, Dtrovision LLC, http://www.dtrovision.com, accessed Jul. 13, 2007, 2 pages.

Author Unknown, "Kaleidescape Home Page", Kaleidescape, Inc., http://www.kaleidescape.com, accessed Jul. 13, 2007, 1 page.

Author Unknown, "MediaMax Overview", Axonix Corporation, http://www.axonix.com/mediamax/, accessed Jul. 13, 2007, 2 pages.

Author Unknown, "Series 2 TiVo Home Media Features Guide," TiVo Inc., 2005, 47 pages.

Author Unknown, "ST-C5DVI-150:150 foot DVI Video Extender, "Installation and Operation Manual, Software Version 1.2, Network Technologies Inc., 2006, Manual 063 Revision, Oct. 16, 2006, 11 pages.

Author Unknown, "Yahoo! Messenger," Yahoo! Inc., 2007, http://messenger.yahoo.com/chat.php, accessed Jan. 9, 2007, 2 pages.

Degermark, M. et al., "Low-loss TCP/IP Header Compression for Wireless Networks," MOBICOM '96, Proceedings of the Second Annual International Conference on Mobile Computing and Networking, Rye, New York, USA, Nov. 10-12, 1996, ACM 1996, 14 pages.

Dittmann, J. et al., "Robust MPEG Video Watermarking Technologies," ACM Multimedia, Bristol, UK, Aug. 1998, pp. 71-80.

Fridrich, J., "Applications of Data Hiding in Digital Images," Tutorial for the ISPACS '98 Conference in Melbourne, Australia, Nov. 4-6, 1998, 33 pages.

Judge, P. et al., "WHIM: Watermarking Multicast Video with a Hierarchy of Intermediaries," Computer Networks: The International Journal of Computer and Telecommunications Networking, Aug. 21, 2002, vol. 39, Issue 6, pp. 699-712.

Klyne, G. et al., "Composite Capability/Preference Profiles (CC/PP): Structure and Vocabularies 1.0," W3C Recommendation Jan. 15, 2004, W3C, 2004, http://www.w3.org/TR/2004/REC-CCPP-struct-vocab-20040115/, accessed Jan. 9, 2007, 61 pages.

Koch, E. et al., "Towards Robust and Hidden Image Copyright Labeling," IEEE Workshop on Nonlinear Signal and Image Processing, presented Jun. 20-22, 1995, pp. 452-455.

Raisinghani, V., "ECLAIR: An Efficient Cross Layer Architecture for Wireless Protocol Stacks," 5th World Wireless Congress, San Francisco, CA, May 25-28, 2004, 6 pages.

Setton, E. et al., "Cross-Layer Design of Ad Hoc Networks for Real-Time Video Streaming," IEEE Wireless Communications, Aug. 2005, vol. 12, Issue 4, pp. 59-65.

Srivastava, V. et al., "Cross-Layer Design: A Survey and the Road Ahead," IEEE Communications Magazine, Dec. 2005, vol. 43, Issue 12, pp. 112-119.

Stam, N., "Router-Based Parental Controls," PC Magazine, Aug. 3, 2004, Ziff Davis Publishing Holdings Inc., http://www.pcmag.com/article2/0,1759,1619375,00.asp, accessed Jan. 9, 2007, 6 pages.

Advisory Action for U.S. Appl. No. 11/475,360, mailed Sep. 7, 2010, 3 pages.

Final Office Action for U.S. Appl. No. 11/475,360, mailed Oct. 15, 2009, 13 pages.

Final Office Action for U.S. Appl. No. 11/475,360, mailed Jun. 24, 2010, 17 pages.

Non-final Office Action for U.S. Appl. No. 11/475,360, mailed Apr. 15, 2009, 10 pages.

Non-final Office Action for U.S. Appl. No. 11/475,360, mailed Jan. 5, 2010, 11 pages.

Notice of Allowance for U.S. Appl. No. 11/475,360, mailed Jan. 12, 2011, 6 pages.

Notice of Allowance for U.S. Appl. No. 11/475,360, mailed Sep. 27, 2011, 7 pages.

IEEE Computer Society, "IEEE: Amendment 8: Medium Access Control (MAC) Quality of Service Enhancements", IEEE Std 802.11e, Nov. 11, 2005, 221 pages, Institute of Electrical and Electronics Engineers, Inc., New York, NY.

* cited by examiner

HIGH-SPEED WAN TO WIRELESS LAN GATEWAY

RELATED APPLICATIONS

The present application is a continuation of U.S. application Ser. No. 11/475,360, filed Jun. 27, 2006, the disclosure of which is hereby incorporated by reference herein in its entirety.

FIELD OF THE INVENTION

The present invention relates to a gateway device and more particularly relates to a gateway device interconnecting a high speed Wide Area Network (WAN) to a lower speed Wireless Local Area Network (WLAN).

BACKGROUND OF THE INVENTION

Historically, residential gateways provided a routing function from an in-home Local Area Network (LAN) to a Wide Area Network (WAN) based Asynchronous Digital Subscriber Line (ADSL) or Data Over Cable Service Interface Specification (DOCSIS) connection. Bandwidth available from the WAN ranged from 200 kbps to 6 Mbps. The LAN side of the gateway was either a single or multiple 10/100 Bt Ethernet connections serving client computers. Eventually, these Ethernet connections were replaced with wireless IEEE 802.11b/a/g LANs operating from 6 to 50 Mbps. The smaller bandwidth capabilities of the WAN versus the LAN kept downstream traffic flow simple in the gateway. Upstream traffic from the LAN to WAN was seldom an issue because users were less sensitive to this bottleneck. A typical upstream bottleneck scenario would be sending an email with a large attachment. In this situation, the Transfer Control Protocol (TCP) service of the gateway would simply throttle the LAN connection to the appropriate speed for the WAN.

With the advent of Fiber-to-the-Home (FTTH) networks, the traditional scenario described above has been reversed. In a FTTH network, a high speed FTTH data connection is provided to the residential gateway. The FTTH data connection provides data rates in the range of 1 to 10 Gbps. In contrast, the proposed IEEE 802.11n standard for wireless LANs provides data rates in the range of 100 to 500 Mbps. As such, the traditional residential gateway architecture will limit overall performance to the wireless LAN bandwidth, thereby negating much of the value of the FTTH connection. Thus, there is a need for an improved residential gateway architecture for interconnecting a high speed WAN to a lower speed wireless LAN.

SUMMARY OF THE INVENTION

The present invention relates to a gateway interconnecting a high speed Wide Area Network (WAN) and a lower speed Wireless Local Area Network (WLAN). The high speed WAN is preferably connected to the gateway via a Fiber-to-the-Home (FTTH) connection and associated FTTH modem. In general, the gateway includes an adaptable cross-layer offload engine operating to manage bandwidth between the high speed WAN and the lower speed WLAN. As data enters the gateway from the WAN at the high speed data rate of the WAN, the offload engine stores the data in a non-secure data cache. A rule check engine performs a stateless or stateful inspection of the data in the non-secure data cache. Once inspected by the rule check engine, the data is moved from the non-secure cache to the secure cache and thereafter transmitted to an appropriate user device in the WLAN at a lower data rate of the WLAN.

Prior to transmitting the data, the gateway may also perform additional functions such as, but not limited to, file format conversion, Digital Rights Management (DRM) encoding or decoding, and Data Encryption Standard (DES) encryption or decryption.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 3:
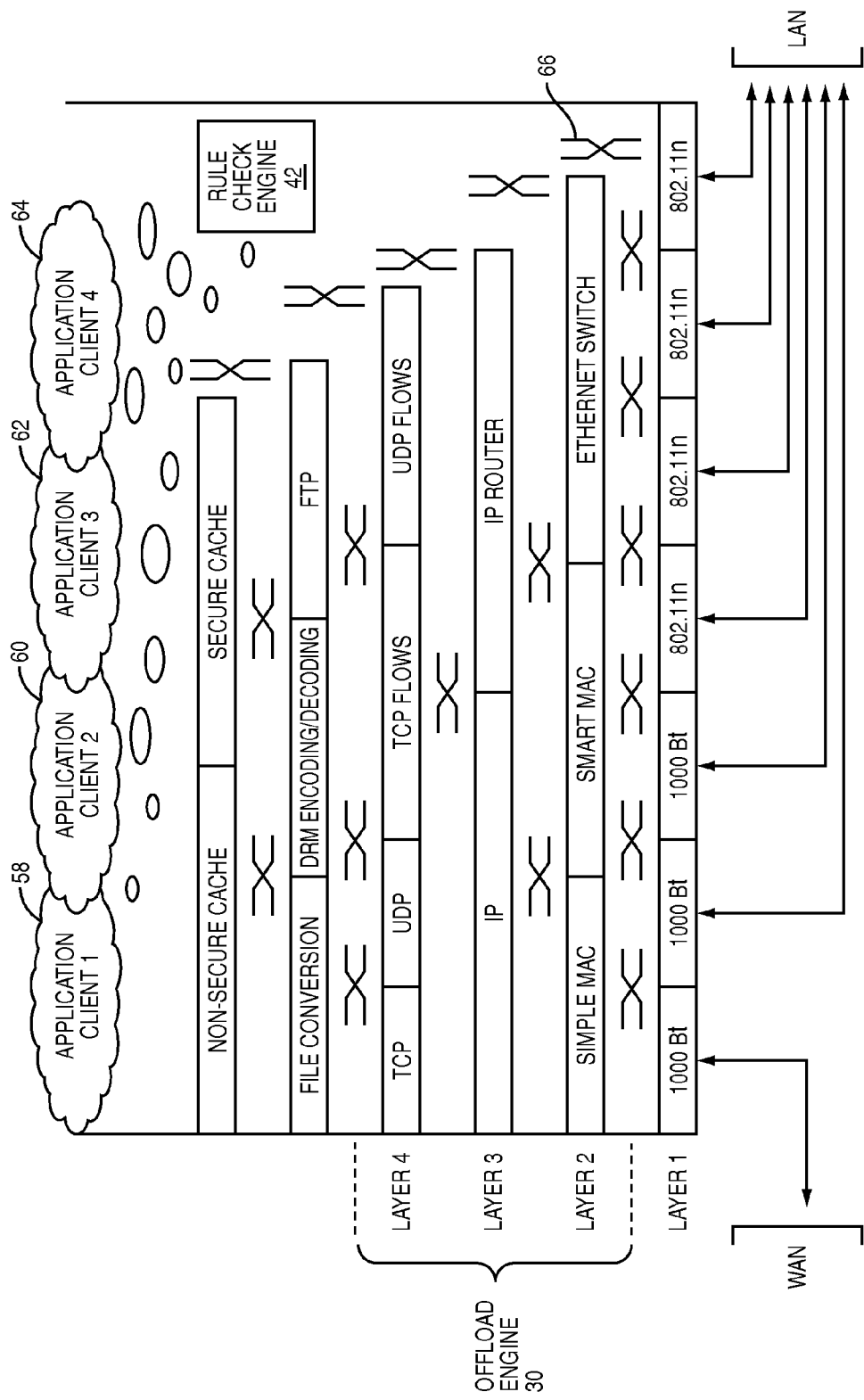
Figure 4:
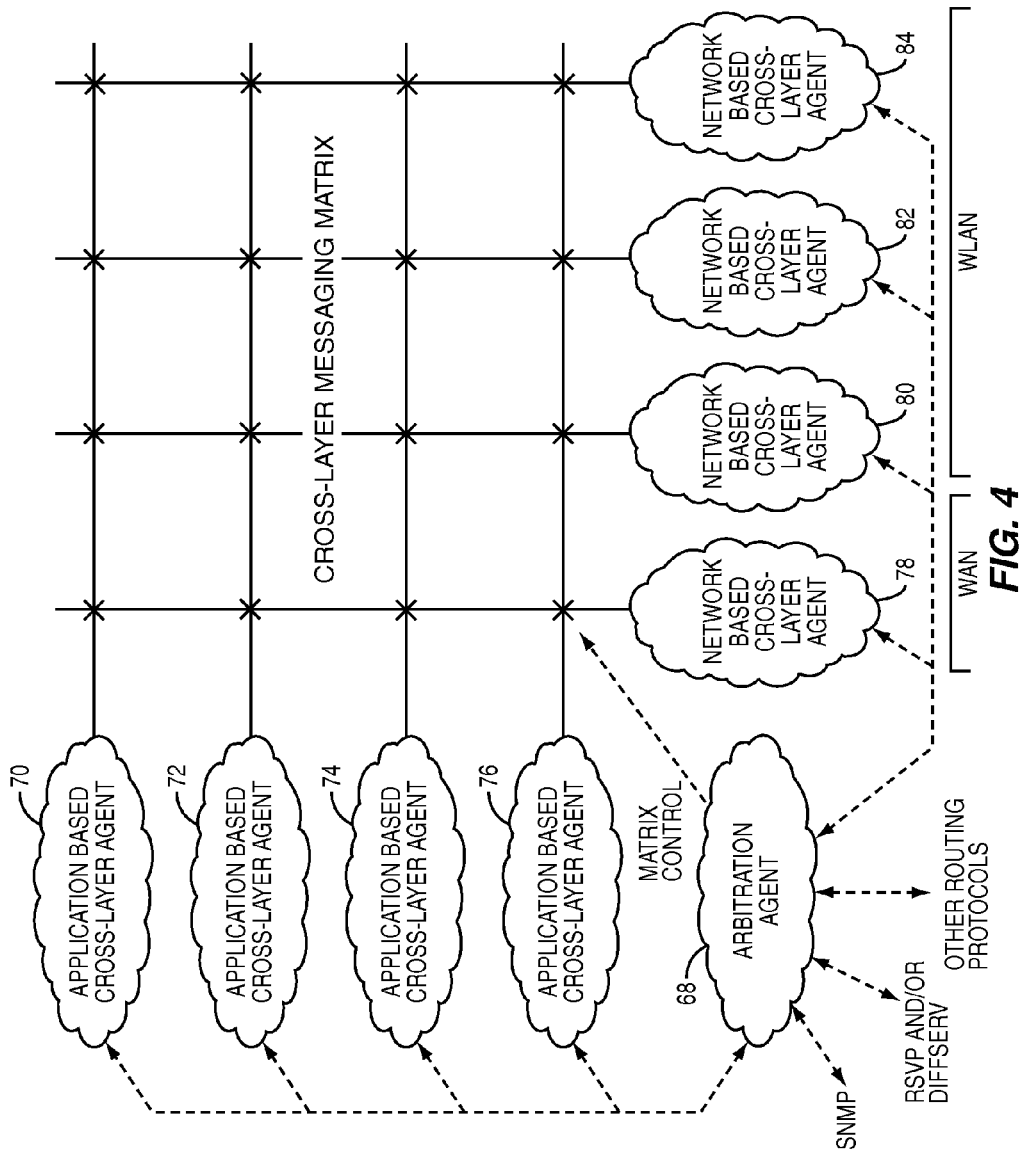

FIG. 3 is an exemplary protocol stack representation of the adaptable cross-layer gateway according to one embodiment of the present invention; and FIG. 4 illustrates an exemplary cross-messaging matrix controlled to provide a complete protocol stack having a cross-layer architecture for a network connection implemented by the adaptable cross-layer gateway according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
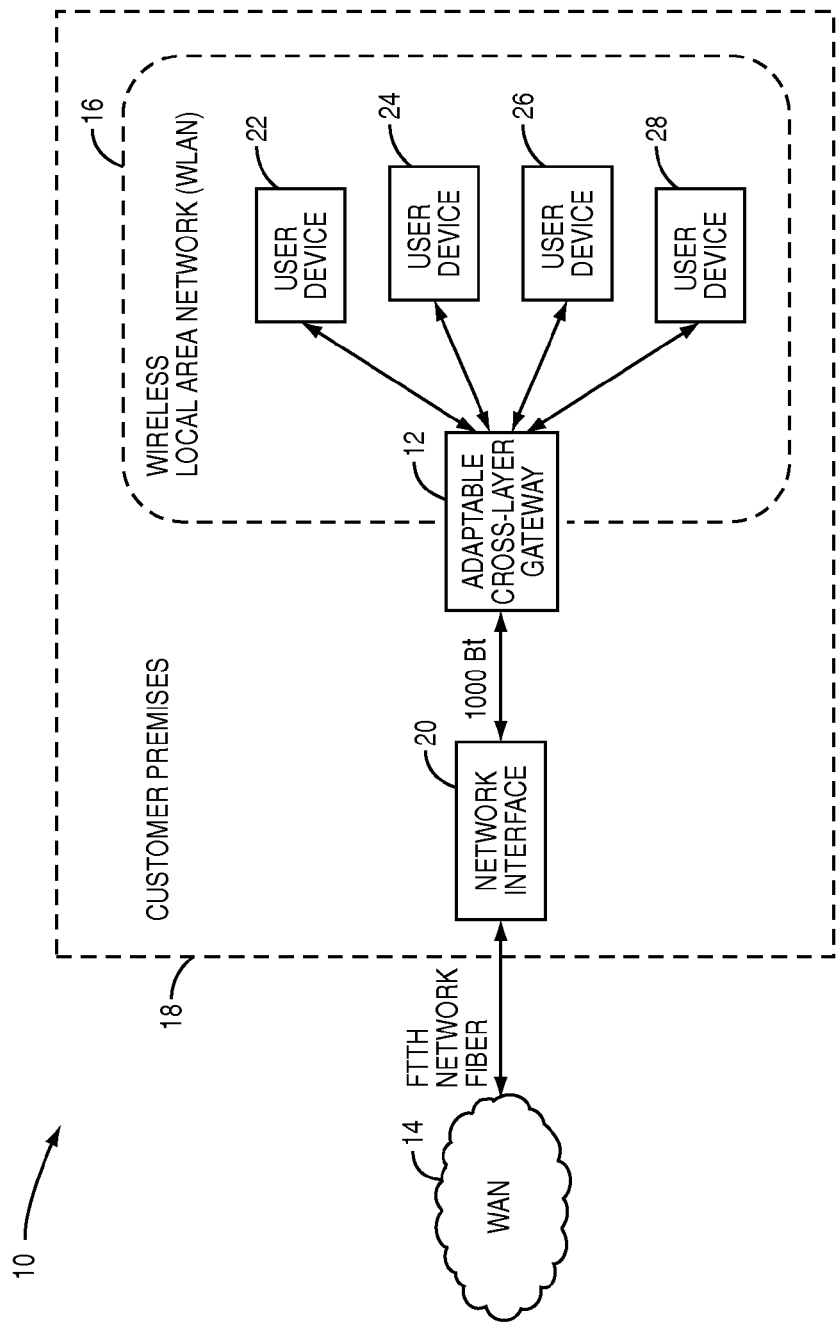
FIG. 1 illustrates a system including an adaptable cross-layer gateway for interconnecting, or bridging, a high speed Wide Area Network (WAN) to a lower speed Wireless Local Area Network (WLAN) according to one embodiment of the present invention.

FIG. 1 illustrates a system 10 including an adaptable cross-layer gateway 12 interconnecting, or bridging, a high speed WAN 14 and a lower speed WLAN 16 according to one embodiment of the present invention. In addition, as discussed below, the gateway 12 offloads data to data caches in order to take advantage of the high data rate provided by the high speed WAN 14. In addition, by using cross-layering techniques, the gateway 12 improves the performance of the WLAN 16 in order to take further advantage of the high speed WAN 14. The gateway 12 may be implemented in hardware or a combination of hardware and software. For example, the gateway 12 may include one or more Application Specific Integrated Circuits (ASICs), one or more Digital Signal Processors (DSPs), one or more Field Programmable Gate Arrays (FPGAs), or the like.

The WAN 14 may be a distributed public access network such as the Internet. Preferably, the WAN 14 provides a Fiber-to-the-Home (FTTH) connection to a customer premises 18, which in this example includes a network interface 20, the gateway 12, and the WLAN 16. FTTH generally refers to a broadband network where a fiber-optic connection is provided to the home. The FTTH connection provides data rates equal to or greater than 1 Gigabit per second (Gbps). For example, the FTTH connection may provide data rates in the range of and including 1 to 10 Gbps. The network interface 20 may be a FTTH modem providing an interface between the FTTH connection and the gateway 12. In this exemplary embodiment, the network interface 20 provides an optical to electrical Gigabit Ethernet connection (1000 Bt) to the gateway 12. It should be noted that while the preferred high speed connection to the WAN 14 is the FTTH connection discussed herein, the present invention is not limited thereto. The gateway 12 of the present invention may be used to interconnect, or bridge, any high speed WAN to a lower speed LAN regardless of the type of connection provided to the WAN. For example, the gateway 12 may interconnect an OC-192 (9.95328 Gbps) or 10 Gigabit Ethernet WAN to a multiport Gigabit Ethernet (1000 Bt) lower speed LAN.

The WLAN 16 may operate, for example, according to one or more of the suite of IEEE 802.11 standards such as the IEEE 802.11a, IEEE 802.11b, IEEE 802.11g, or the proposed IEEE 802.11n standards. The WLAN 16 is formed by the gateway 12 and a number of user devices 22-28 each having a wireless interface. The user devices 22-28 may be, for example, personal computers, Personal Video Recorders (PVRs), Personal Digital Assistants (PDAs), other Internet Protocol (IP) appliances, or the like, or any combination thereof.

Figure 2:
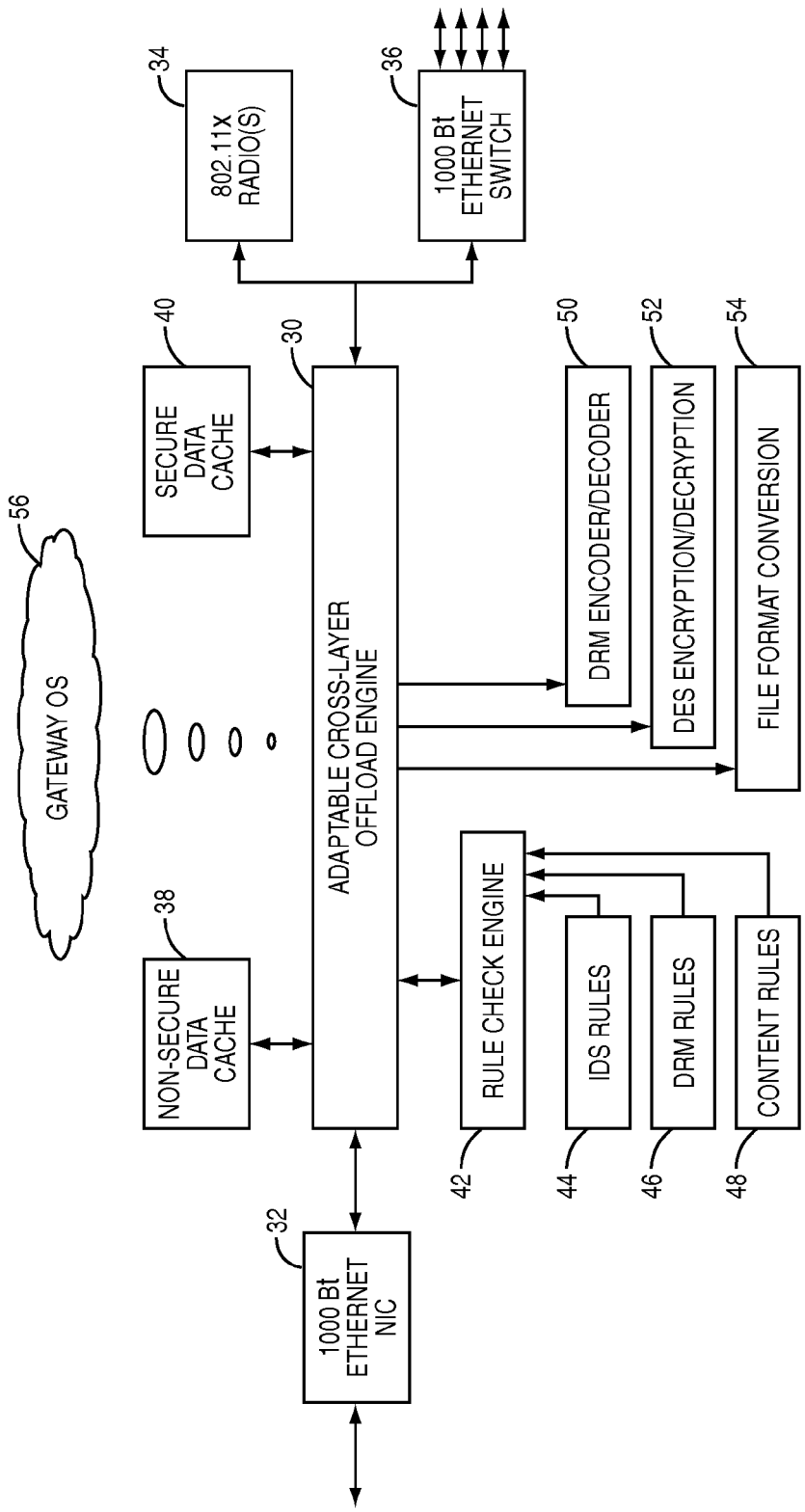
FIG. 2 is a block diagram of the adaptable cross-layer gateway of FIG. 1 according to one embodiment of the present invention.

FIG. 2 is a more detailed block diagram of the gateway 12 according to one embodiment of the present invention. At the heart of the gateway 12 is an adaptable cross-layer offload engine 30 that manages bandwidth, or traffic flow, between the WAN 14 and the WLAN 16. The offload engine 30 utilizes cross-layer functionality and is configurable to adapt to varying conditions in the WLAN 16. The offload engine 30 is preferably implemented in hardware, but may alternatively be implemented in software or a combination of hardware and software.

The offload engine 30 is communicatively coupled to the WAN 14 via, in this example, a Gigabit Ethernet Network Interface Card (NIC) 32, which is connected to the WAN 14 (FIG. 1) via the network interface 20. The NIC 32 may generally be referred to as a high speed network interface. The offload engine 30 is communicatively coupled to the WLAN 16, and more specifically the user devices 22-28 in the WLAN 16, via one or more wireless radios 34. In this example, the wireless radios 34 are IEEE 802.11n wireless radios. However, the present invention is not limited thereto. The gateway 12 may also include an Ethernet switch 36 or the like providing one or more wired connections to additional LAN devices.

The gateway 12 also includes a non-secure data cache 38 and a secure data cache 40. The non-secure and secure data caches 38 and 40 are used to buffer data as needed by the offload engine 30. While illustrated separately, the data caches 38 and 40 may be implemented in a single physical cache where, for example, flags are used to identify secure and non-secure data. The non-secure data cache 38 is used to store received data from the WAN 14 for inspection and processing prior to forwarding the data to the WLAN 16. The non-secure data cache 38 may also be used to buffer large data sets from the WLAN 16 waiting for transmission over the WAN 14. By buffering data in the non-secure data cache 38, the gateway 12 is enabled to take advantage of the full bandwidth provided by the FTTH connection. The secure data cache 40 is used to temporarily store data from the non-secure data cache 38 that has been inspected and cleared for transmission prior to transmission to the user devices 22-28 in the WLAN 16.

A rule check engine 42 operates to inspect the data in the non-secure data cache 38 according to a number of rules, which in this example include Intrusion Detection System (IDS) rules 44, Digital Rights Management (DRM) rules 46, and other general or specific content rules 48. The rule check engine 42 may perform stateless inspection, stateful inspection, or both stateless and stateful inspection. The IDS rules 44 are generally rules for detecting malicious network traffic and may include, for example, typical firewall rules. The DRM rules 46 may be rules for protecting media files, such as videos, songs, and images, stored on the user devices 22-28 within the WLAN 16 when transmitted over the WAN 14. In addition, the DRM rules 46 may include rules for identifying incoming content to be encoded as a security feature to prevent unauthorized viewing of the specified content by, for example, children within the WLAN 16. The content rules 48 may include rules regulating the types of content that may be accessed by the user devices 22-28 within the WLAN 16. In addition, as discussed below, the rule check engine 42 may inspect the data passing through the gateway 12 based on rules for triggering additional functions provided by the gateway 12.

The gateway 12 may also include various additional functional components such as, but not limited to, a DRM encoder/decoder 50, a Digital Encryption System (DES) encryption/decryption function 52, and a file format conversion function 54. The functions 50-54 may be triggered either directly or indirectly by the rule check engine 42 based on associated rules used to inspect data passing through the gateway 12.

The DRM encoder/decoder 50 may be implemented in hardware, software, or a combination of hardware and software, and may be used to protect content transmitted over the WAN 14 from the user devices 22-28 within the WLAN 16. In addition or alternatively, the DRM encoder/decoder 50 may be used in conjunction with firewall technology to create a security feature that prevents unauthorized viewing of specified content on the user devices 22-28. More specifically, in the outgoing direction, the DRM encoder/decoder 50 may operate to encode content leaving the WLAN 16. For example, personal videos, songs, images, or the like stored by the user devices 22-28 may be encoded by the DRM encoder/decoder 50 such that only desired recipients may view or play the content. As for incoming content, the DRM encoder/decoder 50 may, for example, encode specified types of content from the WAN 14 to prevent unauthorized viewing by, for example, children. License keys could be distributed by the gateway 12 to appropriate user devices 22-28 to unlock the encoded content. It should be noted that the present invention is not limited to DRM encoding or decoding. Other types of encoding and decoding may be used as desired.

The DES encryption/decryption function 52 may be implemented in the wireless radios 34. However, the present invention is not limited thereto. The DES encryption/decryption function 52 operates to provide encryption and decryption of data transmitted over the WLAN 16 as commonly understood in the art. Additionally, DES and DRM may share the same encryption/decryption functions.

The file format conversion function 54 may be implemented in hardware, software, or a combination of hardware and software, and may be used to reduce the size of or otherwise adapt incoming content in order to reduce the bandwidth required to transfer the content to the appropriate user devices 22-28. More specifically, the file format conversion function 54 may convert the content from a first file format to a second file format having reduced bandwidth requirements, reduce the quality of the content, or both. For example, the file format conversion function 54 may convert a Motion Pictures Experts Group (MPEG) Layer 2 (MPEG-2) video file to a MPEG Layer 4 (MPEG-4) video file, thereby reducing the bandwidth required to transfer the video file over the WLAN 16. In addition or alternatively, the file format conversion function 54 may reduce the quality of the content such that the bandwidth required to transfer the content over the WLAN 16 is also reduced. For example, the quality of video content may be reduced by reducing the resolution, bit rate, or frame rate. The file format conversion function 54 may process incoming content as the content is provided to the gateway 12 or after the content is entirely transferred to the gateway 12.

The gateway 12 also includes a gateway operating system (OS) 56, which operates to configure and control the operation of the offload engine 30, the rule check engine 42, and the various functions 50-54. The gateway OS 56 may include client agents loaded, or configured, by the user devices 22-28. Using these client agents, the gateway OS 56 may be configured to, for example, convert all incoming MPEG-2 files to MPEG-4 files for all of the user devices 22-28; convert all incoming MPEG-2 files to MPEG-4 files for the user device 22; convert all incoming MPEG-2 files to AVI files for the user device 24; block all video content to the user device 26; block only Internet Protocol (IP) streaming content to the user device 28; use DRM encoding on all multimedia content and restrict playback to the user device 22; and configure the gateway 12 to immediately cache e-mail with attachments and provide the e-mail and attachments to the appropriate one of the user devices 22-28 over available radio frequency (RF) spectrum using a background operation. The above operations are intended to be exemplary and as such should not be construed to limit the scope of the present invention. These configurations may be implemented by the gateway OS 56 as additional rules for the rule check engine 42.

In operation, when data is received from the WAN 14 via the NIC 32, the offload engine 30 offloads the data into the non-secure data cache 38. While in the non-secure data cache 38, the data is inspected by the rule check engine 42 based on the rules 44-48 and any additional rules from the gateway OS 56 for triggering the functions 50-54. Once the data is cleared for transmission, the data is transferred to the secure data cache 40 where the data remains until transmission to the appropriate user devices 22-28 over the WLAN 16. As for outgoing data, data from the user devices 22-28 in the WLAN 16 is received by the gateway 12. For large data sets, such as large data files, or optionally for all outgoing data, the offload engine 30 offloads the data into the non-secure data cache 38. Once the data is buffered, the data is transmitted over the WAN 14. In one embodiment, the data is buffered to the extent needed to take full advantage of the bandwidth provided by the FTTH connection. However, note that for small data transfers such as, for example, a Hypertext Transfer Protocol (HTTP) request, the gateway 12 may chose not to buffer the data.

FIG. 3 illustrates an Open Systems Interconnect (OSI) model of the gateway 12 showing the cross-layer implementation of the gateway 12 according to one embodiment of the present invention. The traditional OSI model allows communication and data exchange only between adjacent layers in the protocol stack. However, as illustrated in FIG. 3, the gateway 12 enables communication and data exchange between all layers, including non-adjacent layers, of the protocol stack. The connectivity of the various layers of the protocol stack is controlled by the gateway OS 56. More specifically, in this embodiment, the gateway OS 56 includes application clients 58-64, which are associated with corresponding applications such as, but not limited to, a File Transfer Protocol (FTP) application, an HTTP application, a Real-time Transfer Protocol (RTP) and RTP Control (RTPC) application, and a streaming MPEG application. The application clients 58-64 operate to control the connectivity of the various protocol stack layers, or adapt the cross-layering scheme, for transfers by the associated applications.

In this embodiment, the offload engine 30 corresponds to layers 2-4 of the illustrated protocol stack. In addition, as illustrated, numerous switches 66 provide interfaces between the various protocol stack layers. The switches 66 may be implemented in hardware or software. In one embodiment, the switches 66 are implemented as an internal bus of the offload engine 30.

As will be apparent to one having ordinary skill in the art upon reading this disclosure, the performance of the WLAN 16 can be significantly improved by using cross-layering techniques. By improving the performance of the WLAN 16, the WLAN 16 gains further advantage from the high bandwidth capabilities of the FTTH connection to the WAN 14. For example, cross-layering techniques may be used to remove, or bypass, layers such as the IP/IP Router layer (Layer 3) when transferring data between the user devices 22-28 in the WLAN 16. Further, when the gateway 12, or more specifically the associated application client 58-64, detects that a data transfer is between two of the user devices 22-28, the gateway 12 may establish a Layer 2 connection between the two user devices using the Ethernet Switch service. In either of these situations, the gateway 12 may notify associated cross-layer agents on the user devices 22-28 of the cross-layering technique used for transfers to the user devices 22-28.

As another example, if an incoming data transfer meets alternate transfer criteria, the gateway 12 may use cross-layering techniques to establish an alternate point-to-point wireless link between the gateway 12 and the particular one of the user devices 22-28 over an alternate wireless channel. The alternate wireless channel may be a wireless channel not used by the gateway 12 when performing normal access point functions. For example, the alternate wireless channel may be provided by a secondary wireless communication interface operating on a frequency channel that does not overlap with the primary wireless channels used by the gateway 12 for normal access point operation. An exemplary system that establishes alternate wireless channels based on alternate transfer criteria is disclosed in U.S. patent application Ser. No. 11/443,761, entitled SYSTEM AND METHOD FOR BYPASSING AN ACCESS POINT IN A LOCAL AREA NETWORK FOR P2P DATA TRANSFERS, filed May 31, 2006, which is hereby incorporated herein by reference in its entirety.

FIG. 4 illustrates a cross-layer messaging matrix that may be implemented by the gateway 12 to control the interconnections of the various protocol stack layers illustrated in FIG. 5. For a detailed discussion of the cross-layer messaging matrix, the interested reader is referred to U.S. patent application Ser. No. 11/443,882, entitled CROSS-LAYER ARCHITECTURE FOR A NETWORK DEVICE, filed May 31, 2006, which is hereby incorporated herein by reference in its entirety.

In general, an arbitration agent 68 operates to associate application based cross-layer agents 70-76 with one or more network based cross-layer agents 78-84 and to interconnect various layers of the protocol stack as needed to provide a complete cross-layer protocol stack for a given network connection. The application based cross-layer agents 70-76 are preferably sub-components of the application clients 58-64 (FIG. 3), respectively. As such, each of the application based cross-layer agents 70-76 are associated with a particular application such as a FTP application, an HTTP application, a RTP/RTPC application, a streaming MPEG application, or the like. The network based cross-layer agents 78-84 are each associated with one of the wireless network interfaces 34, or radios 34, of the gateway 12. The network based cross-layer agents 78-84 provide or facilitate information-sharing between and control of the low level protocol stack layers. For example, the network based cross-layer agent 78 may provide or facilitate information sharing between and control of layers 1-4 for a first wireless network interface, or wireless radio, 34 of the gateway 12. Further, the network based cross-layer agent 78 may be associated with the application based cross-layer agents 70-76 by the arbitration agent 68 using the cross-layer messaging matrix to facilitate information sharing between and control of the low level protocol stack layers and the upper protocol stack layers when desired.

In operation, for example, if incoming data is to be transferred to the user device 22 within the WLAN 16 via the FTP application, the arbitration agent 68 may determine that a particular wireless network interface, or wireless radio, 34 of the gateway 12 is capable of or preferred for providing a network connection to the user device 22. Then, by controlling the cross-layer messaging matrix, the arbitration agent 68 operates to interconnect the FTP application to the wireless network interface, or wireless radio, 34 via the protocol stack of the gateway 12, and interconnect the application based cross-layer agent 70 associated with the FTP application and the network based cross-layer agent 78 associated with the wireless network interface, or wireless radio, 34 to provide a complete protocol stack having a cross-layer architecture for the network connection.

Those skilled in the art will recognize improvements and modifications to the preferred embodiments of the present invention. All such improvements and modifications are considered within the scope of the concepts disclosed herein and the claims that follow.

What is claimed is:

1. A gateway interconnecting a first network to a second network comprising:
    an offload engine that includes a number of protocol stack layers from a protocol stack of the gateway and is implemented in a cross-layer architecture enabling communication between non-adjacent layers in the protocol stack;
    a secure data cache associated with the offload engine;
    a non-secure data cache;
    a network interface communicatively coupling the offload engine to the first network and providing a first data rate; and
    an interface associated with the offload engine and adapted to communicate with a plurality of user devices within the second network, the interface providing a second data rate that is less than the first data rate of the network interface;
    wherein the offload engine is adapted to:
        receive content from the first network via the network interface at the first data rate;
        store the content in the non-secure data cache such that the first data rate is supported by the gateway; and
        transmit the content from the data cache to a corresponding one of the plurality of user devices in the second network via the interface at the second data rate.

2. The gateway of claim 1 wherein the network interface is coupled to the second network via a Fiber-to-the-Home (FTTH) connection.

3. The gateway of claim 1 wherein the interface operates according to one of the plurality of IEEE 802.11 standards.

4. The gateway of claim 1 wherein the first data rate provided by the network interface is at least 1 Gigabit per second (Gbps).

5. The gateway of claim 4 wherein the second data rate provided by the second network is less than or equal to 500 Megabits per second (Mbps).

6. The gateway of claim 1 further comprising a rule check engine adapted to inspect the content from the first network based upon at least one rule prior to transmitting the content to the corresponding one of the plurality of user devices in the second network.

7. The gateway of claim 6 wherein the rule check engine performs a stateful inspection of the content.

8. The gateway of claim 6 wherein the rule check engine performs a stateless inspection of the content.

9. The gateway of claim 6 wherein the at least one rule comprises at least one intrusion detection rule for detecting malicious network traffic.

10. The gateway of claim 6 wherein the at least one rule comprises at least one Digital Rights Management (DRM) rule.

11. The gateway of claim 10 further comprising a DRM function initiated by the rule check engine based on the at least one DRM rule.

12. The gateway of claim 11 wherein:
    the rule check engine is further adapted to inspect the content based on the at least one DRM rule to identify data to be processed by the DRM function and initiate the DRM function for the identified data; and
    the DRM function is adapted to encode the identified data such that encoded data is transmitted to the corresponding one of the plurality of user devices within the second network, and provide license keys for decoding the encoded data to desired ones of the plurality of user devices having permission to consume the encoded data.

13. The gateway of claim 6 wherein the at least one rule comprises at least one content rule identifying a type of content to block from entering the second network.

14. The gateway of claim 1 further comprising a file format conversion function adapted to convert the content that is in a first file format to a second file format having lesser bandwidth requirements.

15. The gateway of claim 1 further comprising a conversion function adapted to convert the content corresponding to a media file having a first quality to a media file having a lesser quality, thereby reducing bandwidth requirements for transferring the media file over the second network.

16. The gateway of claim 1 further comprising a rule check engine adapted to:
    inspect the content to identify data in a specified file format; and
    initiate a file format conversion function adapted to convert the content to a new file format having lesser bandwidth requirements prior to transmission of the identified data over the second network.

17. The gateway of claim 1 further comprising a rule check engine adapted to:

inspect the content to identify data corresponding to a media file in a specified file format; and initiate a conversion function adapted to reduce a quality of the media file prior to transmission of the identified data over the second network.

18. The gateway of claim 1 wherein the offload engine is further adapted to:
receive outgoing data from one of the plurality of user devices within the second network at the second data rate provided by the interface;
buffer the outgoing data in the non-secure data cache; and
transmit the outgoing data from the non-secure data cache to a desired end point via the network interface at the first data rate of the network interface.

19. The gateway of claim 18 further comprising:
a rule check engine adapted to inspect the outgoing data to identify data desired to be encoded prior to transmission over the first network; and
a Digital Rights Management (DRM) encoding function adapted to encode the identified data prior to transmission over the first network.

20. A method of interconnecting a first network and a second network comprising:
receiving content from the first network at a first data rate;
offloading the content to a data cache;
transmitting the content from the data cache to a corresponding one of a plurality of user devices within the second network at a second data rate of the second network that is less than the first data rate of the first network, wherein the content is offloaded to the data cache such that the first and second data rates are supported;
inspecting the content in the data cache based on at least one Digital Rights Management (DRM) rule to identify data to be processed by a DRM function;
encode the identified data using the DRM function such that the encoded data is transmitted to the corresponding one of the plurality of user devices within the second network; and
providing license keys for decoding the encoded data to desired ones of the plurality of user devices having permission to consume the encoded data.

21. The method of claim 20 wherein transmitting the content from the data cache comprises transmitting the content from the data cache according to an adaptable cross-layering scheme.

22. The method of claim 20 wherein receiving the content comprises receiving the content from the second network via a Fiber-to-the-Home (FTTH) connection.

23. The method of claim 20 further comprising inspecting the content from the second network in the data cache based upon at least one rule prior to transmitting the content to the corresponding one of the plurality of user devices in the second network.

24. The method of claim 20 further comprising:
inspecting the content to identify data in a specified file format;
converting the identified data to a new file format having lesser bandwidth requirements; and
transmitting the identified data in the new file format to the corresponding one of the plurality of user devices within the second network.

25. The method of claim 20 further comprising:
inspecting the content to identify data corresponding to a media file in a specified file format;
reducing a quality of the media file, thereby reducing bandwidth requirements of the media file; and
transmitting the reduced quality media file to the corresponding one of the plurality of user devices in the second network.

26. The gateway of claim 1 wherein the first network is a Wide Area Network (WAN).

27. The gateway of claim 1 wherein the second network is a Local Area Network (LAN).

28. The gateway of claim 20 wherein the first network is a Wide Area Network (WAN).

29. The gateway of claim 20 wherein the second network is a Local Area Network (LAN).

30. A gateway device comprising:
a first interface for receiving content at a first data rate in a first format from a first network;
a data cache for storing the content;
a rules check engine for determining Digital Rights Management (DRM) rules for the content;
a format conversion function for processing the content from the first format to a second format having a different data rate requirement;
a DRM encoder for encoding the converted content for authorized devices of a second network; and
a second interface for transmitting the encoded content over the second network.

31. The gateway of claim 30 wherein the first network is a Wide Area Network (WAN).

32. The gateway of claim 30 wherein the second network is a Local Area Network (LAN).

33. The gateway of claim 32 wherein the LAN is a Wireless Local Area Network (WLAN).

34. The gateway of claim 33 wherein the WLAN operates according to one of the 802.11 standards.

* * * * *

UNITED STATES PATENT AND TRADEMARK OFFICE
CERTIFICATE OF CORRECTION

| | | |
|---|---|---|
| PATENT NO. | : 8,879,567 B1 | Page 1 of 1 |
| APPLICATION NO. | : 13/329992 | |
| DATED | : November 4, 2014 | |
| INVENTOR(S) | : Gregory M. Evans | |

It is certified that error appears in the above-identified patent and that said Letters Patent is hereby corrected as shown below:

In the Claims

In column 9, at line 36, replace "encode" with --encoding--.

Signed and Sealed this
Tenth Day of February, 2015

Michelle K. Lee
*Deputy Director of the United States Patent and Trademark Office*

(12) INTER PARTES REVIEW CERTIFICATE (886th)
United States Patent (10) Number: US 8,879,567 K1
Evans (45) Certificate Issued: Feb. 22, 2018

(54) HIGH-SPEED WAN TO WIRELESS LAN GATEWAY

(75) Inventor: Gregory Morgan Evans

(73) Assignee: Qurio Holdings, Inc.

Trial Numbers:

IPR2016-00080 filed Oct. 24, 2015
IPR2016-00994 filed May 1, 2016

Inter Partes Review Certificate for:

Patent No.: 8,879,567
Issued: Nov. 4, 2014
Appl. No.: 13/329,992
Filed: Dec. 19, 2011

The results of IPR2016-00080 and IPR2016-00994 are reflected in this inter partes review certificate under 35 U.S.C. 318(b).

INTER PARTES REVIEW CERTIFICATE
U.S. Patent 8,879,567 K1
Trial No. IPR2016-00080
Certificate Issued Feb. 22, 2018

AS A RESULT OF THE INTER PARTES REVIEW PROCEEDING, IT HAS BEEN DETERMINED THAT:

Claims 20, 21, 24 and 25 are cancelled.

\* \* \* \* \*